United States Patent [19]
Kutz et al.

[11] Patent Number: 5,299,067
[45] Date of Patent: Mar. 29, 1994

[54] AUXILIARY LENS ATTACHMENT

[75] Inventors: John R. Kutz, Sykeston, N. Dak.; Mark W. Baumgartner, Holdingford, Minn.

[73] Assignee: Markzmen Optics, Sykeston, N. Dak.

[21] Appl. No.: 990,703

[22] Filed: Dec. 15, 1992

[51] Int. Cl.$^5$ .............................................. G02B 7/02
[52] U.S. Cl. ..................................... 359/827; 359/823; 359/829; 359/422; 359/425; 354/295
[58] Field of Search ............... 359/822, 823, 825, 827, 359/829, 830, 405, 406, 417, 421, 422, 425, 426, 427, 428, 429, 813; 354/219, 222, 295, 296

[56] References Cited

U.S. PATENT DOCUMENTS

| | | |
|---|---|---|
| 1,508,043 | 9/1924 | Barrows . |
| 2,381,101 | 8/1945 | Bausch . |
| 2,610,545 | 9/1952 | Davidson . |
| 3,048,079 | 8/1962 | Dine et al. .......................... 359/827 |
| 3,153,690 | 10/1964 | Kuyt et al. .......................... 359/425 |
| 3,351,408 | 11/1967 | Krewalk .............................. 359/355 |
| 3,522,983 | 8/1970 | Daniels .............................. 359/481 |
| 3,594,061 | 7/1971 | Selvage .............................. 359/600 |
| 3,719,132 | 3/1973 | Urano ................................. 354/219 |
| 3,740,121 | 6/1973 | Everett .............................. 359/813 |
| 3,761,162 | 9/1973 | Hall .................................... 359/829 |
| 3,828,991 | 8/1974 | Moore ................................ 359/829 |
| 4,119,984 | 10/1978 | Zajac ................................. 354/219 |
| 4,135,778 | 1/1979 | Lincoln ............................... 359/381 |
| 4,264,123 | 4/1981 | Mabie ................................ 359/600 |
| 4,408,842 | 10/1983 | Gibson ............................... 359/422 |
| 4,416,528 | 11/1983 | Breslau et al. ..................... 354/296 |
| 4,502,760 | 3/1985 | Alfille ................................. 359/892 |
| 4,523,818 | 6/1985 | Lang et al. ......................... 359/600 |
| 4,576,459 | 3/1986 | Miura et al. ....................... 354/287 |
| 4,614,403 | 9/1986 | Kersten et al. .................... 359/830 |
| 4,936,667 | 6/1990 | Rohr et al. ......................... 359/480 |
| 4,952,041 | 8/1990 | Sandall .............................. 359/422 |
| 5,054,886 | 10/1991 | Ozaki et al. ....................... 359/823 |

OTHER PUBLICATIONS

Advertisement entitled "BALLARD TM LENS HOOD" made by Ballard Industries, patent pending notice on the advertisement (Exhibit A).
Advertisement entitled "BUSHWACKER TM SCOPE COVER" made by Quake Industries (Exhibit B).
Advertisement entitled "TASCO-HAZE FILTER" (Exhibit C).
Applicant's description of Exhibits A,B,C (Exhibit D).
Brochure entitled "BAUSCH & LOMB, BUSHNELL", ©1992 Bausch & Lomb Incorporated (Exhibit E).
Brochure entitled "STEINER" (Exhibit F).
Brochure entitled "Heckler & Koch Firearms" (Exhibit G).

*Primary Examiner*—Loha Ben
*Attorney, Agent, or Firm*—Merchant, Gould, Smith, Edell, Welter & Schmidt

[57] ABSTRACT

An auxiliary lens attachment, installed a prescription or colored enhancement lens, is mounted onto an end of a rifle scope. The auxiliary lens attachment includes an adaptor having a lens receiving portion at a first end, a lens securing portion in a middle and a rifle scope mounting portion at a second end. A distance adjusting member is positioned on the securing portion of the adaptor to adjust the distance between the securing portion and the mounting portion.

13 Claims, 4 Drawing Sheets

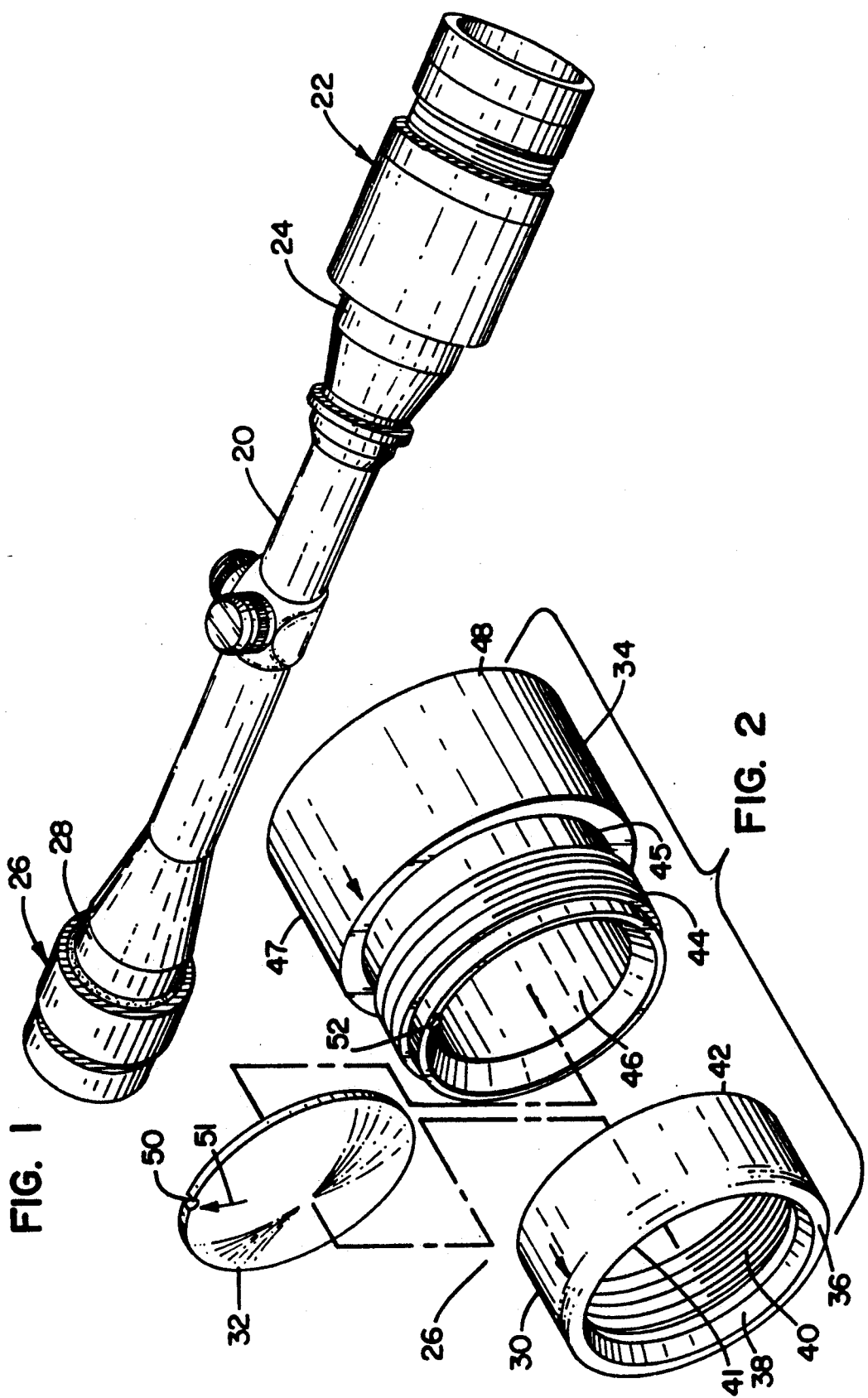

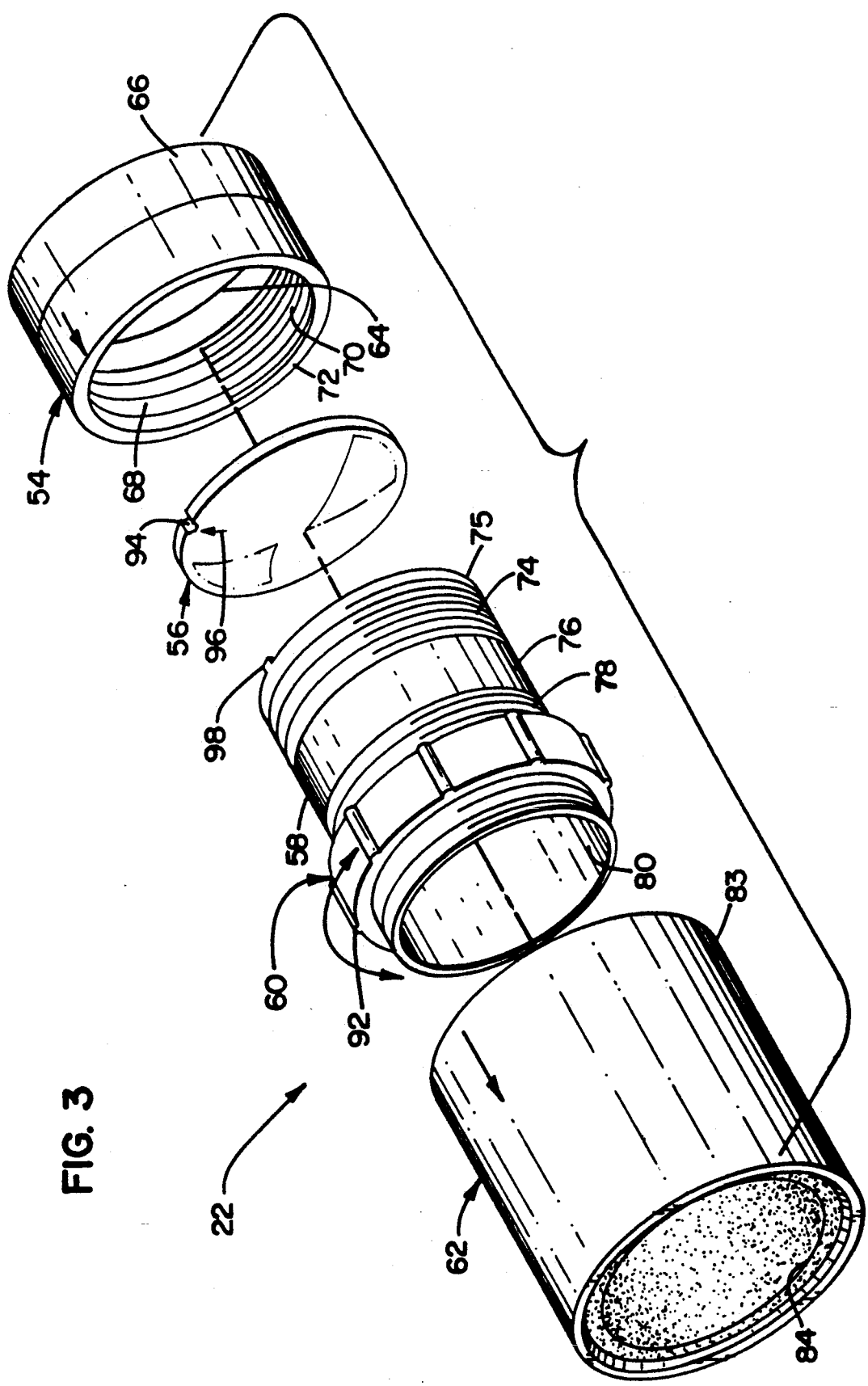

AUXILIARY LENS ATTACHMENT

FIELD OF THE INVENTION

The present invention relates to an auxiliary lens attachment. More particularly, the present invention relates to an auxiliary lens attachment for an optical instrument having a personalized prescription lens and/or colored enhancement lens.

BACKGROUND OF THE INVENTION

A person Who uses prescription glasses experiences difficulties in using an optical instrument such as a telescope, binocular, camera, gun scope or microscope, etc. One concern is that the prescription glasses increase the distance between eyepieces in the optical instrument and person's eyes so that the person does not usually have the full scope of the view which is magnified from the optical instrument.

Another problem is that prescription glasses are anisotropic and have a definite optical center. If the person's eyes look through the prescription glasses at an angle, the prescription with respect to the eyes will change accordingly. Therefore, the prescription at that time does not fit person's eyes.

One method to solve this problem is to wear prescription contact lenses. However, it is usually not convenient to wear contact lenses for a long time and unwear them. Further, oculists usually prefer to prescribe lenses less than full correction. Therefore, it is not proper to use a full correction prescription lens as a contact lens for normal use. Neither is it desirable to use a lower correction contact lens with the optical instrument as this will affect its function.

In addition to the above concerns, a cheap, light and simple auxiliary lens attachment for optical instruments is desired.

U.S. Pat. No. 1,508,043 issued to Barrows discloses an auxiliary lens being embodied in a structure of a microscope to correct refractive errors of the person using the microscope.

U.S. Pat. No. 2,381,101 issued to Bausch discloses an adjustable eye cap for optical instruments.

U.S. Pat. No. 2,610,545 issued to Davidson discloses a telescope having an inclined-axis eye piece.

U.S. Pat. No. 3,351,408 issued to Krewalk discloses a sunlight-filtering ocular adaptor for telescopes permitting the direct viewing therewith of intensely luminous objects.

U.S. Pat. No. 3,594,061 issued to Selvage discloses an eye guard displaceably mounted at a non-prescription eyepiece.

U.S. Pat. No. 4,119,984 issued to Zajac discloses an eyepiece for use in conjunction with an optical instrument of a camera.

U.S. Pat. No. 4,264,123 issued to Mabie discloses a gun telescope bellows-type extender which absorbs gun recoil to prevent injuring to the eye.

U.S. Pat. No. 4,416,528 issued to Breslau et al. discloses a camera lens accessory and a mounting ring construction for positioning and locking lens accessories.

U.S. Pat. No. 4,936,667 issued to Rohr et al. discloses a binocular microscope attachment for correction of ametropia.

The present invention provides numerous advantages over the prior art including the provision of a cheap, simple, light auxiliary lens attachment including a prescription lens having full correction prescription thereon.

SUMMARY OF THE INVENTION

The present invention relates to an auxiliary lens attachment. More particularly, the present invention relates to an auxiliary lens attachment for an optical instrument having a personalized prescription lens and/or colored enhancement lens.

One embodiment of the present invention is an auxiliary lens attachment comprising a lens and an adaptor having receiving, securing and mounting portions. The receiving portion includes a stop flange to receive the lens. The securing portion, including threaded grooves, secures the lens within the receiving portion. The mounting portion connects to the securing portion at one end and mounts onto an optical instrument at the other end so that the auxiliary lens attachment is attached to the optical instrument. Resilient means is positioned between the mounting portion and the optical instrument to mount the lens attachment onto the optical instrument.

In one embodiment, a lock assembly having threaded grooves shares the corresponding threaded grooves of the securing portion with the mounting portion. The distance between the lens and the optical instrument is adjusted by rotating the lock assembly. The further away from the lens the lock assembly is moved, the longer the distance exists between the lens and the optical instrument, vice versa.

In one embodiment, the lens has an aperture. A corresponding projection on the securing portion is inserted into the aperture so that there is no axial and transverse movements of the lens within the receiving portion.

Furthermore, in another embodiment, an arrow is marked on the lens to identify a predetermined position of the lens. One object of this feature is to indicate the predetermined prescription orientation in the lens so that the best view is obtained by positioning the lens in the predetermined orientation.

In same embodiment, a colored enhancement lens replaces the prescription lens for normal eyes. The colored enhancement lens enhances the light being received and magnified by the optical instrument.

In one embodiment, the lens attachment is mounted on the eye side of the optical instrument when it includes a prescription lens.

In another embodiment of the present invention, an auxiliary lens attachment includes a receiving and securing/mounting portions wherein the securing portion is integral with the mounting portion to secure the lens inside the receiving portion at one end and to mount the lens attachment onto the optical instrument at the other end.

Still in another embodiment, the lens attachment is mounted on the view side of the optical instrument when a colored enhancement lens is used.

Further in another embodiment, a colored enhancement lens is secured into one auxiliary lens attachment. Another auxiliary lens attachment with a prescription lens is attached to the eye side of the optical instrument. The auxiliary lens attachment with the colored enhancement lens is attached to the view side of the optical instrument so that it is possible to have both the prescription and colored enhancement lens on the same optical instrument.

In one embodiment, a prescription lens is positioned close to the eyepiece of a binocular so that the binocular is converted to a personal prescription binocular. The prescription lens is held by a soft rubber tube at the eye side.

In another embodiment, a prescription lens is positioned in a lens attachment embodiment as discussed above. The prescription lens is therefore received and secured into the receiving portion, and the lens attachment is mounted onto a binocular close to the eyepiece. Thereby, the binocular is converted to a personal prescription binocular.

These and various other advantages and features of novelty which characterize the invention are pointed out with particularity in the claims annexed hereto and forming a part hereof. However, for a better understanding of the invention, its advantages, and objects obtained by its use, reference should be had to the drawings which form a further part hereof, and to the accompanying descriptive matter, in which there is illustrated and described a preferred embodiment of the invention.

BRIEF DESCRIPTION OF THE DRAWINGS

In the drawing in which like reference numerals and letters generally indicate corresponding parts throughout the several views, FIG. 1 is a perspective view in accordance with the principles of the present invention including a first embodiment of an auxiliary lens attachment, with a lock assembly, attached to the right side of an optical instrument and a second embodiment of an auxiliary lens attachment with an integral securing/mounting portion attached to the left side of the optical instrument.

FIG. 2 is an exploded view of the second embodiment of the lens attachment shown in FIG. 1 at the left side of the optical instrument.

FIG. 3 is an exploded view of the first embodiment of the lens attachment shown in FIG. 1 at the right side of the optical instrument.

DETAILED DESCRIPTION OF THE PREFERRED EMBODIMENTS

Figure 4:
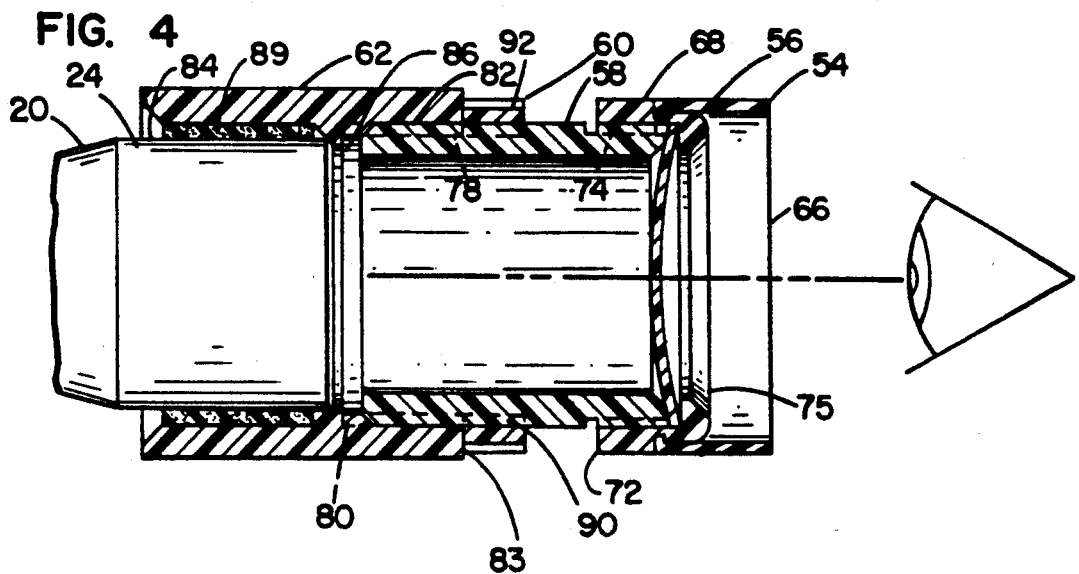
FIG. 4 is a cross-sectional view of the first embodiment of the lens attachment.

Referring to FIG. 1, there is shown an embodiment of an auxiliary lens attachment 22 attached to a first end 24 of an optical instrument 20. A second embodiment of an auxiliary lens attachment 26 is attached to a second end 28 of the optical instrument 20.

Now, referring to FIG. 2, the second embodiment of the auxiliary lens attachment 26 which is attached to the left side of the optical instrument 20 is shown. The auxiliary lens attachment 26 includes a receiving portion 30, a lens 32 and a securing/mounting portion 34. It is preferred that the lens 32 is a prescription lens or a color enhancement lens.

A radially inwardly extending stop flange 36 is disposed at a first end 38 of the receiving portion 30. The lens 32 is positioned in the receiving portion 30 wherein a concave side of the lens 32 is facing and abutting an inner wall of the stop flange 36. A diameter of an inner circumference of the lens 32 is larger than a diameter of the stop flange 36, but smaller than a diameter of a circumference of an interior surface 41 of the receiving portion 30 so that the lens 32 is precisely fitted proximate to the first end 38 of the receiving portion 30.

First threaded grooves 40 are disposed on the interior surface 41 of the receiving portion 30 which extends to a second end 42 of the receiving portion 30 so that the lens 32 is disposed at one end of the first threaded grooves 40.

Further referring to FIG. 2, the lens 32 is secured by the securing/mounting portion 34 which includes second threaded grooves 44 on an exterior surface 45 at a first end 46 of the securing/mounting portion 34. The lens 32 is secured in the receiving portion 30 by threadedly rotating the receiving portion 30 onto the securing/mounting portion 34, the second threaded grooves 44 cooperating with the first threaded grooves 40.

If a color enhancement lens is used, the securing/mounting portion 34 is preferably mounted on the second end 28 of the optical instrument 20 at a second end 48 of the securing/mounting portion 34. A diameter of an interior surface 47 of the securing/mounting portion 34 is larger than a diameter of the second end 28 of the optical instrument 20. A compressible, resilient rubberized foam layer (not shown) is disposed between the interior surface 47 of the securing/mounting portion 34 and an exterior surface 45 of the second end 28 of the optical instrument 20. The resilient rubberized foam layer is used to fit the securing/mounting portion 34 to various diameters of optical instruments so that different sizes or models of the optical instrument 20 can use the same sized auxiliary lens attachment 26. Alternatively, at least one resilient O-ring is used to replace the resilient rubberized foam layer. It will be appreciated that other embodiments might be used to allow attachment to various diameters of optical instruments. Moreover, it will be appreciated that varying sizes of auxiliary lens attachments might be used.

In addition, a notch 50 which is disposed on a peripheral edge of the lens 32 aligns with a projection 52 which is disposed on the first end 46 of the securing/mounting portion 34 so that the lens 32 is secured in the receiving portion 30. No axial, traverse or rotational movements of the lens 32 are allowed in the receiving portion 30. Since the prescription lens is preferably used in the preferred embodiment, the orientation of the prescription lens is predetermined and adjustable when the projection 52 is inserted in the notch 50 so that the user is able to obtain a full correction precise view received from the optical instrument 20. Further, an arrow 51 is marked on the lens 32 which is used to identify the prescription orientation of the lens 32. Additional indicia might also be provided on the lens attachment itself.

Now, referring to FIGS. 3 and 4, the auxiliary lens attachment 22 is shown. The auxiliary lens attachment 22 includes a receiving portion 54, a lens 56, a securing portion 58, a sleeve member 60 and a mounting portion 62.

The receiving portion 54 and the lens 56 of the auxiliary lens attachment 22 are the same as that of the auxiliary lens attachment 26 which have previously been discussed. Thus, the lens 56 is disposed and attached to a stop flange 64 at a first end 66 of the receiving portion 54, and the lens is secured by threadedly attaching first threaded grooves 68 in an inner surface 70 onto corresponding second threaded grooves 74 on an outer surface 76 of the securing portion 58 at a first end 75 of the receiving portion 58. A notch 94 which is disposed on the lens 56 is inserted by a projection 98 which is disposed on the first end 75 of the securing portion 58 so that the lens 56 is secured to an inner wall of the flange 64.

Third threaded grooves 78 are disposed on the outer surface 76 at a second end 80 of the securing portion 58. Fourth threaded grooves 82, which are disposed in an inner surface 84 of the mounting portion 62 at a first end 83, corresponds to the third threaded grooves 78. The fourth threaded grooves 82 threadedly attach to the third threaded grooves 78. The third threaded grooves 78 are shared by the fourth threaded grooves 82 and fifth threaded grooves 90 which are disposed on an inner surface of the sleeve member 60. The sleeve member 60 is removably and threadedly mounted onto the third threaded groove 78. The fourth threaded grooves 82 occupy the remaining portion of the third threaded grooves 78 which are close to the second end 80 of the securing portion 58 so that the sleeve member 60 threadedly adjusts both the position of the sleeve member 60 along the third threaded grooves 78 and the remaining portion of the third threaded portion 78 occupied by the fourth threaded portion 82. Therefore, a distance between the receiving portion 54 and the mounting portion 62 is adjusted by the sleeve member 60. In addition, the sleeve member 60 stops further movement of the mounting portion 62 toward the receiving portion 54 so that the sleeve member 60 is also used to lock the movement of the mounting portion 62 toward the receiving portion 54. Moreover, the more threaded grooves occupied by the mounting portion 62, the less distance is between the mounting portion 62 and the receiving portion 54, vice versa.

Further, a stop flange 86 is disposed on the inner surface 84 close to an end of the fourth threaded grooves 82 away from the first end 83 of the mounting portion 62. The stop flange 86 stops the first end 24 of the optical instrument 20 from moving toward the first end 83 of the mounting portion 62.

A plurality of ribs 92 for grasping the sleeve member 60, which are perpendicular to the transverse rotation of the sleeve member 60, are disposed on an outer surface of the sleeve member 60. Further, as discussed above, a resilient rubberized foam layer 89 is disposed between the inner surface 84 of the mounting portion 62 and an outer surface of the first end 24 of the optical instrument 20.

Referring now to FIG. 4, the lens 56 is secured in the receiving portion 54 by the securing portion 58. On the other hand, the lens 56 can be readily removed from the receiving portion 54 by threadedly rotating the receiving portion 54 of the securing portion 58 so that the auxiliary lens attachment 22 can be used as a universal lens attachment for using different lenses. The lens 56 is axially aligned with the optical instrument 20 so that a precise full-scale view is received in the user's eyes.

Figure 5:
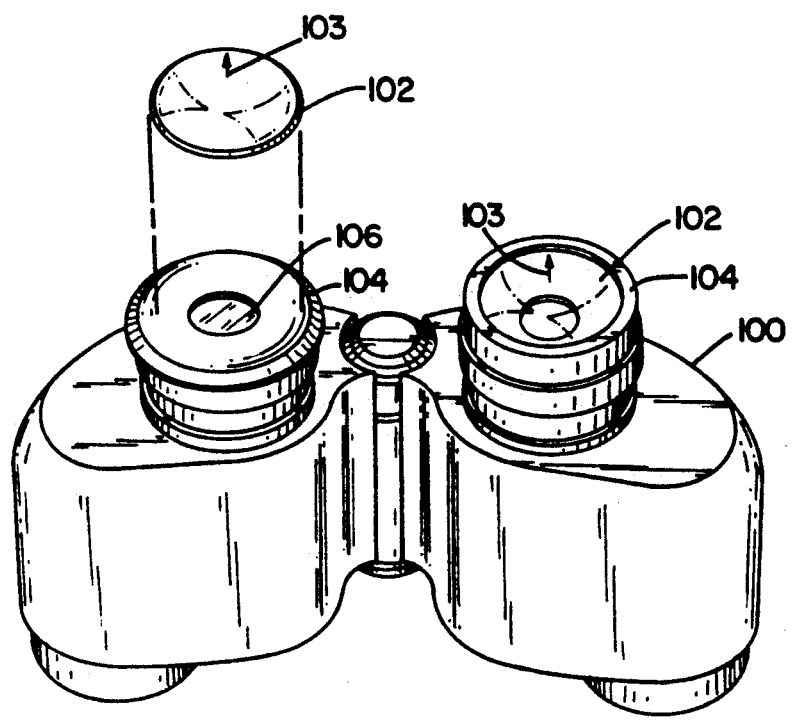
FIG. 5 is a binocular having a prescription lens secured at an eyepiece of the binocular by foldable eye shields.

Referring now to FIG. 5, a binocular 100 is shown to be converted to a prescription binocular by placing a prescription lens 102 close to an eye-piece 106 of the binocular 100. The binocular 100 includes a foldable eye shield 104 which can be folded downwardly to place the prescription lens 102 proximate to the eye-piece 106. Then, the eye shield 104 is rolled upwardly to hold the prescription lens 102 in place.

Figure 6:
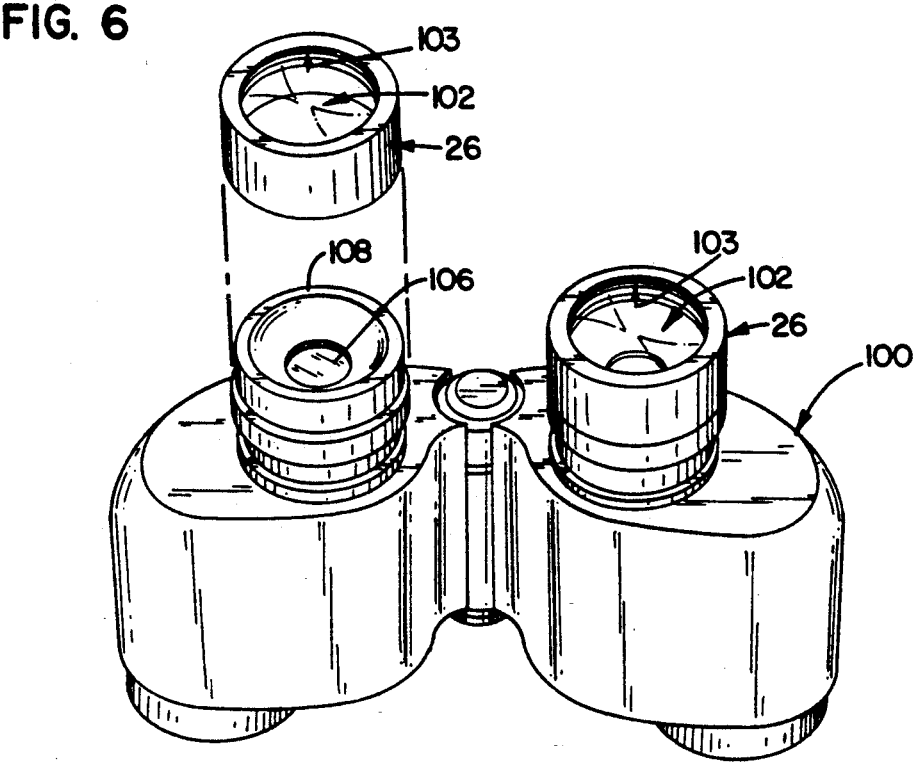
FIG. 6 is a binocular having an auxiliary lens attachment with a prescription lens mounted on the binocular.

Now, referring to FIG. 6, a binocular 100 is converted to the prescription binocular by mounting the lens attachment 26 onto a hard eye shield 108 of the binocular 100. The prescription lens 102, which is secured in the auxiliary lens attachment 26, aligns with the eye-piece 106 so as to allow the eyeglass wearers to obtain a precise full-scale view received and magnified by the binocular 100. An arrow 103, identifying the prescription orientation of the lens 102, is disposed on the prescription lens 102 so that the user can easily determine the predetermined prescription orientation of the lens 102.

Figure 7:
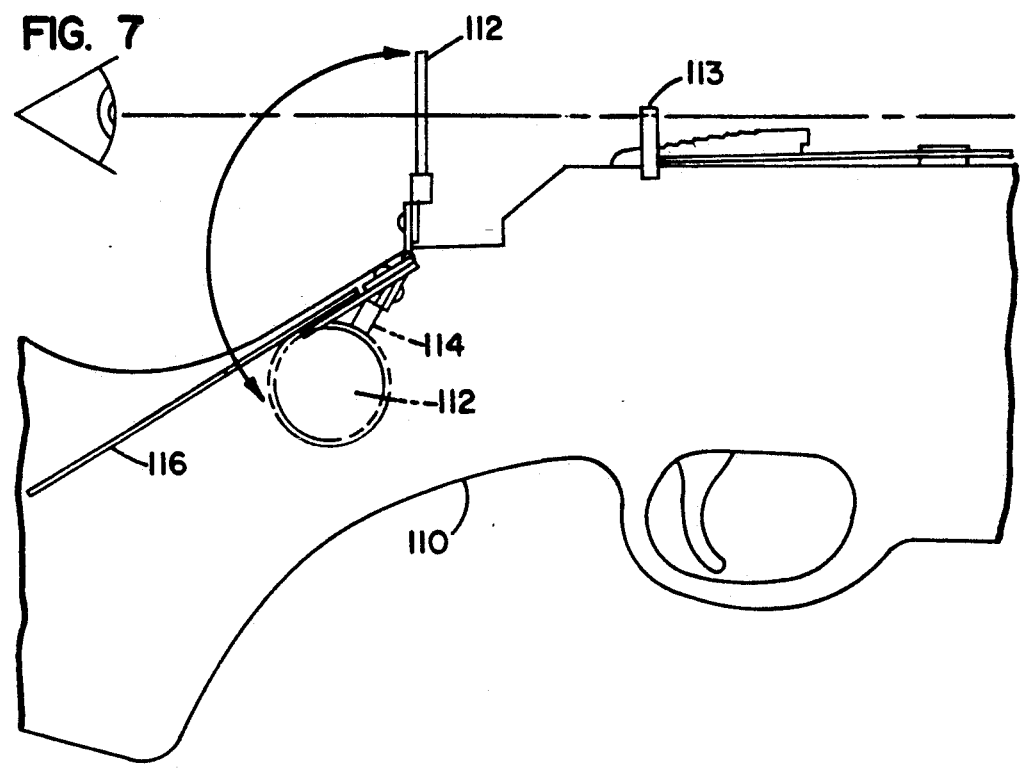
FIG. 7 is an open gun site having a prescription lens attachment disposed and stored on the gun.

Now, referring to FIG. 7, a prescription lens 112 is mounted on a rifle or a shotgun 110 behind an alignment 113 of an open site on the rifle or shotgun. The prescription lens 112 is held by a support 114, which is manually adjustable axially of the rifle, to adjust the distance between the prescription lens 112 and the alignment 113. The support 114 is also preferably vertically adjustable. The support 114 and the prescription lens 112 are stored and locked in a notch 116 of the rifle 110 when the prescription lens 112 is not used. It will be appreciated that any member of conventional supports 114 might be used for vertical and axial adjustment of the support 114. A spring mechanism might be present to cause the lens 112 to be rotated roughly 90 degrees between its in use portion and its stored portion. Thus, a rifle open site can be readily converted to a prescription rifle 110 open site, if desired. Accordingly, the rifle 110 can be used by both eyeglass wearers and the normal eye users.

It is to be understood, however, that even though numerous characteristics and advantages are in the present invention and have been set forth in the foregoing description, together with details of the structure and function of the invention, the disclosure is illustrative only and the changes may be made in detail, especially in matters of shape, size and arrangement of parts within the principles of the invention to the full extent indicated by the board general meaning of the terms in which the appended claims are expressed.

What is claimed is:

1. An auxiliary lens attachment used to attach a lens to an optical instrument, comprising:

an adaptor having a lends receiving portion at a first end, a lens securing portion in a middle and an optical instrument mounting portion at a second end;

means for receiving the lens in the receiving portion of the adaptor;

means for securing the lens in the receiving portion of the adaptor;

means for attaching the securing portion to the mounting portion;

means for mounting the mounting portion to the optical instrument; and means for adjusting a distance between the mounting and securing portions wherein an inner surface of the receiving portion includes first threaded grooves, the lens being disposable in the receiving portion at an end of the threaded grooves adjacent a radially inwardly extending flange proximate a first end of the receiving portion, a first end of an outer surface of the securing portion has second threaded grooves which correspond to the first threaded grooves of the receiving portion and which cooperate with the first threaded grooves such that the securing portion is receivable in the receiving portion by threading the securing portion into the receiving portion, the securing portion further includes third threaded grooves at a second end on the outer surface, the mounting portion includes fourth threaded grooves at a first end on an inner surface, the mounting and securing portions are secured together when the third and fourth threaded grooves are threadedly mounted together, the adjustment means includes a sleeve member having fifth threaded grooves on an inner surface of the sleeve member, the sleeve member being threadedly mounted on the third threaded grooves of the securing portion, the fifth threaded grooves of the sleeve member and the fourth threaded grooves of the mounting portion share the third threaded grooves.

2. An auxiliary lens attachment set forth in claim 1, wherein the lens is a prescription lens.

3. An auxiliary lens attachment set forth in claim 2, wherein the lens is a colored enhancement lens.

4. An auxiliary lens attachment set forth in claim 1, wherein the distance between the securing and mounting portions is adjusted by rotation of the sleeve member, the distance being longer when the mounting portion occupies a smaller portion of the third threaded grooves, the distance is smaller when the mounting portion shares a larger portion of the third threaded grooves.

5. An auxiliary lens attachment set forth in claim 4, a compressible member being disposed on the inner surface of the mounting portion at a second end of the mounting portion.

6. An auxiliary lens attachment set forth in claim 5, wherein the compressible member is a resilient foam layer.

7. An auxiliary lens attachment set forth in claim 5, wherein at least one o-ring is designed on the optical instrument for receiving the mounting portion.

8. An auxiliary lens attachment set forth in claim 4, wherein the lens has a notch thereon and the first end of the securing portion has a projection which corresponds to the notch so that no axial and traverse movements are allowed when the securing portion secures the lens in the receiving portion, and the lens has a mark which indicates the prescription orientation of the lens.

9. An auxiliary lens attachment set forth in claim 1, wherein the securing and mounting portions are one-piece structure, one end of the one-piece structure secures the lens in the receiving portion and the other end of the one-piece structure mounts the auxiliary lens attachment on the optical instrument.

10. An auxiliary lens attachment set forth in claim 1, wherein the securing and mounting portions have separated pieces, the securing portion secures the lens in the receiving portion and the mounting portion mounts the auxiliary lens attachment on the optical instrument.

11. A method for attaching a prescription lens to an optical instrument, comprising:
   inserting a prescription lens into a receiving portion;
   securing the prescription lens in the receiving portion, wherein the lens is aligned to the securing portion by aligning a notch of the lens to a corresponding projection of the securing portion when the securing portion is threadedly attached to the receiving portion; and
   mounting the receiving portion on the optical instrument.

12. A rifle scope, comprising:
   a rifle scope body;
   an auxiliary lens attachment, being attached to an end of the rifle scope body;
   a prescription lens being retained in the auxiliary lens attachment; and
   the auxiliary lens attachment including:
   an adaptor having a lens receiving portion at a first end, a lens securing portion in a middle and a rifle scope mounting portion at a second end;
   the lens receiving portion including means for receiving the lens in the receiving portion of the adaptor;
   the lens securing portion including means for securing the lens in the receiving portion of the adaptor; and
   the mounting portion including means for mounting the lens attachment on the end of the rifle scope body.

13. An auxiliary lens attachment used to attach a lens to an optical instrument, comprising:
   an adaptor having a lens receiving portion at a first end, a lens securing portion in a middle and an optical instrument mounting portion at a second end;
   means for receiving the lens in the receiving portion of the adaptor;
   means for securing the lens in the receiving portion of the adaptor;
   means for attaching the securing portion to the mounting portion;
   means for mounting the mounting portion to the optical instrument; and
   wherein the lens is aligned to the securing portion by aligning a notch of the lens to a corresponding projection of the securing portion when the securing portion is threadedly attached to the receiving portion.

* * * * *